United States Patent
Ergen et al.

(10) Patent No.: US 7,880,676 B2
(45) Date of Patent: Feb. 1, 2011

(54) METHOD AND SYSTEM FOR HYBRID POSITIONING USING PARTIAL DISTANCE INFORMATION

(75) Inventors: Mustafa Ergen, Oakland, CA (US); Rehan Jalil, San Jose, CA (US)

(73) Assignee: WiChorus Inc., San Jose, CA (US)

( * ) Notice: Subject to any disclaimer, the term of this patent is extended or adjusted under 35 U.S.C. 154(b) by 267 days.

(21) Appl. No.: 11/736,597

(22) Filed: Apr. 18, 2007

(65) Prior Publication Data
US 2008/0125161 A1   May 29, 2008

Related U.S. Application Data

(60) Provisional application No. 60/793,182, filed on Apr. 19, 2006.

(51) Int. Cl.
*G01S 3/02* (2006.01)
(52) U.S. Cl. .................................................... 342/458
(58) Field of Classification Search .......... 342/458–465
See application file for complete search history.

(56) References Cited

U.S. PATENT DOCUMENTS 6,515,623 B2 * 2/2003 Johnson ...................... 342/387
6,748,224 B1 * 6/2004 Chen et al. ................ 455/456.1
2007/0005292 A1 * 1/2007 Jin ............................. 702/150

* cited by examiner

*Primary Examiner*—Thomas H Tarcza
*Assistant Examiner*—Nga X Nguyen
(74) *Attorney, Agent, or Firm*—Hamilton, Brook, Smith & Reynolds, P.C.

(57) ABSTRACT

The present invention provides a method and system for positioning one or more anchor nodes or one or more non-anchor nodes in one or more communication networks. A non-anchor node may be in communication with two or more anchor nodes. The method comprises determining two or more distance measurements, corresponding to raw distances of the non-anchor node from the two or more anchor nodes, at predetermined intervals of time. An estimated distance is then calculated between the two or more anchor nodes based on the two or more distance measurements. Estimated distances between a plurality of anchor nodes in the one or more communication networks is calculated in a similar manner. A partial distance matrix is then populated using the estimated distance between the plurality of anchor nodes. A plurality of geographic coordinates of the plurality of anchor nodes is reconstructed based on the partial distance matrix. The plurality of geographic coordinates is reconstructed based on one or more of a geometric build-up algorithm, a shortest-path algorithm and a multidimensional scaling algorithm.

20 Claims, 8 Drawing Sheets

METHOD AND SYSTEM FOR HYBRID POSITIONING USING PARTIAL DISTANCE INFORMATION

RELATED APPLICATIONS

Benefit is claimed under 35 U.S.C. 119(e) to U.S. Provisional Application Ser. No. 60/793,182, entitled "Method and system for hybrid positioning with partial information", by Mustafa Ergen et al., filed Apr. 19, 2006, which is herein incorporated in its entirety by reference for all purposes.

FIELD OF INVENTION

The present invention relates, generally, to hybrid positioning using partial distance information, and more specifically, to a method and system for determining geographic coordinates of anchor or non-anchor nodes in one or more communication networks using partial distance information.

BACKGROUND OF THE INVENTION

A communication network, typically, supports two types of devices, herein referred to as anchor nodes and non-anchor nodes. For example, in a telecommunication network, a base station may act as an anchor nodes and a mobile station may act as a non-anchor node. Many a times, positional information of anchor nodes or non-anchor nodes is required. For example, in telecommunication network, positional information of a mobile station may be required by a user for navigation purpose, or by a service provider for surveying purpose etc. Similarly, the position information of a base station may be required by a service provider for various applications.

Some existing techniques require hardware upgrades on anchor nodes or on non-anchor nodes in order to position them. For example, some existing methods use GPS sensors for determining geographic coordinates of the base stations and the mobile stations. However, such methods prove to be expensive because of the expensive sensors required. Further, such method may be unreliable since, many a times, such hardware is fragile and can be damaged easily due to daily wear and tear. Moreover, the existing positioning methods may not be applicable to cases where a base station is mobile.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
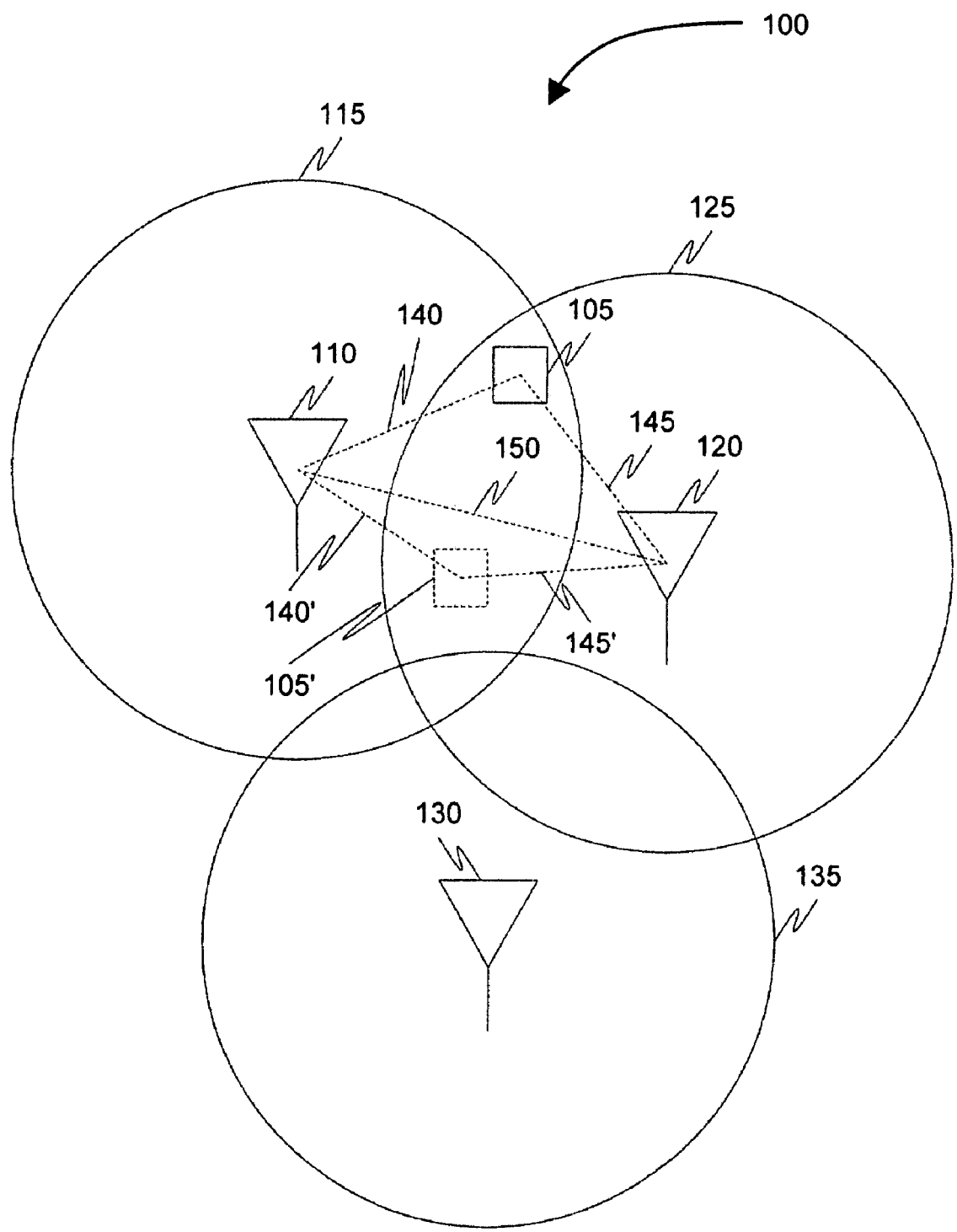
FIG. 1 illustrates an exemplary representation of one or more communication networks.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for determining geographic coordinates of an anchor node or a non-anchor node in one or more communication networks using partial distance information. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method for determining geographic coordinates of an anchor node or a non-anchor node in one or more communication networks using partial distance information described herein. The non-transaction-client circuits may include, but are not limited to, a radio receiver, a radio transmitter, signal drivers, clock circuits, power source circuits, and user input devices. As such, these functions may be interpreted as steps of methods for determining geographic coordinates of an anchor node or a non-anchor node in one or more communication networks using partial distance information. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides methods and systems for hybrid positioning using partial distance information. More particularly, the present invention provides methods and systems for determining geographic coordinates of an anchor node or a non-anchor node in one or more communication networks using partial distance information. The one or more communication networks may comprise a plurality of anchor nodes and a plurality of non-anchor nodes. Examples of the one or more communication networks include, but are not limited to, wireless telecommunication network, Wireless-LAN (WLAN), Bluetooth network, 802.11, Wi-Fi network, wireless sensor network, Wide Area Network (WAN), WiMAX, third generation technology (3G) based communication networks, a network based on IEEE 802.16e, IEEE 802.20 and 3G Long Term Evaluation based communication networks. A non-anchor node in the one or more communication networks can communicate with at least one of the plurality of anchor nodes in the one or more communication networks. For example, in a wireless telecommunication network, an anchor node can be a base station and a non-anchor node can be a mobile station. The mobile station can be in communication with two or more base stations if the mobile station is located within a range of the two or more base stations. Similarly, in communication networks such as Bluetooth networks a first mobile station can function as an anchor node and a second mobile station can function as a non-anchor node. It will be appreciated by persons skilled in the art, that an anchor node may or may not be fixed, for instance, in Bluetooth network both, an anchor node and a non-anchor node, are movable. However, for the sake of simplicity, hereinafter the anchor nodes are considered to be statically positioned in the one or more communication networks and the non-anchor nodes are considered to be movable. However, it will be apparent to a person skilled in art that even if the anchor nodes are movable, the present invention can be used to determine the geographic coordinates of the anchor nodes.

Referring now to the figures and in particular to FIG. 1, an exemplary representation of one or more communication networks 100 is shown. One or more communication networks 100 can comprise, but is not limited to, a wireless telecommunication network, a Wireless-LAN (WLAN), a Bluetooth network, a 802.11 network, a Wi-Fi network, a wireless sensor network or a Wide Area Network (WAN), a WiMAX network, a third generation technology (3G) based communication network, a network based on IEEE 802.16e or IEEE 802.20. One or more communication networks 100 may comprise a plurality of anchor nodes and a plurality of non-anchor nodes. FIG. 1 depicts a non-anchor node 105 located in a range 115 of an anchor node 110 as well as in a range 125 of an anchor node 120. Non-anchor node 105 can, hence, communicate with each of anchor node 110 and anchor node 120. As shown in FIG. 1, non-anchor node 105 is located outside of a range 135 of an anchor node 130 and hence is unable to communicate with anchor node 130. Those skilled in the art will realize that, non-anchor node 105 is shown to be in range of only two anchor nodes however, it will be apparent that non-anchor node 105 can be in range of a plurality of anchor nodes. For example, anchor nodes (or base stations) in a WiMAX network may have larger ranges as compared to anchor nodes in a GSM network. Therefore, non-anchor node 105 may be only in range 115 of anchor node 110 and in range 125 of anchor node 120 in a GSM network. However, non-anchor node 105 may also be in range 135 of anchor node 130 in a WiMAX network, since range of anchor nodes may be larger in WiMAX networks.

Typically in a communication network, anchor nodes are fixed and non-anchor nodes roam in the range of the anchor nodes. For example, if a communication network is a wireless telecommunication network, non-anchor node 105 can be a mobile station and each of anchor node 110, anchor node 120 and anchor node 130 can be a base station. Non-anchor node 105 may roam to a possible position 105' and still be connected to anchor node 110 and anchor node 120. Further, if one or more communication networks 100 comprise a Bluetooth network, non-anchor node 105, anchor node 110, anchor node 120 and anchor node 130 can be mobile stations or laptops or any Bluetooth enabled device. The anchor nodes and the non-anchor nodes in such an ad-hoc communication network are movable.

As shown in FIG. 1, a line 140 corresponds to a distance measurement between non-anchor node 105 and anchor node 110. Similarly, a line 145 corresponds to a distance measurement between non-anchor node 105 and anchor node 120. A line 150 depicts a shortest distance or a raw distance between anchor node 110 and anchor node 120. Further, a line 140' corresponds to a distance measurement between anchor node 110 and possible position 105' of non-anchor node 105. Similarly, a line 145' corresponds to a distance measurement between anchor node 120 and possible position 105' of non-anchor node 105.

Those skilled in the art will realize that one or more communication networks 100 can have a two dimensional arrangement and or a three dimensional arrangement of the plurality of anchor nodes and the plurality of non-anchor nodes. FIG. 1 shows only one non-anchor node and three anchor nodes in a two dimensional arrangement for the sake of clarity, however, it will be appreciated that in reality there can be any number of non-anchor nodes and anchor nodes in any arrangement, and all such arrangements are within the scope of the present invention.

Figure 2:
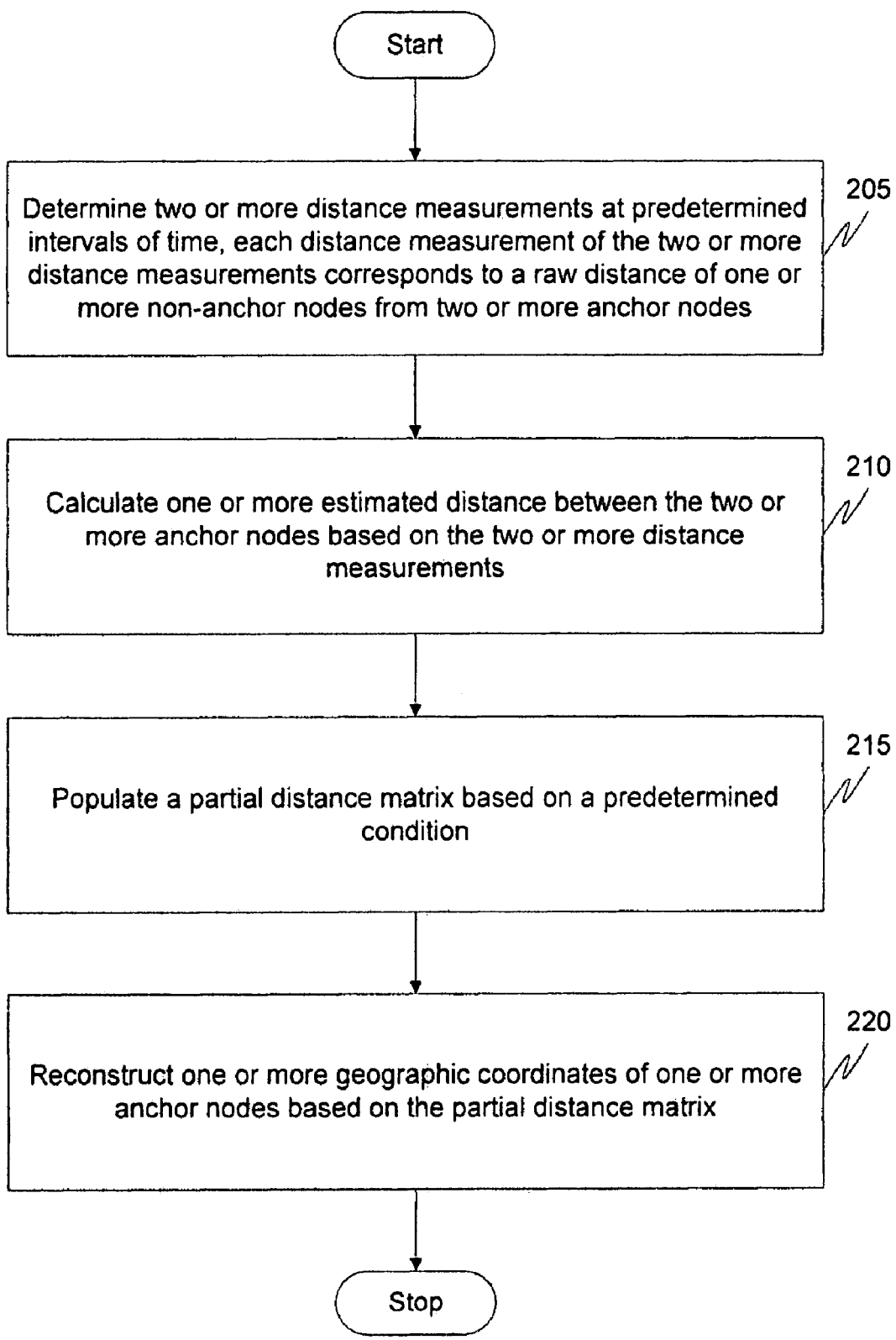
FIG. 2 illustrates a flow diagram of a method for positioning one or more anchor nodes or one or more non-anchor nodes in one or more communication networks in accordance with an embodiment of the present invention.

Referring now to FIG. 2, a flow diagram of a method for positioning one or more anchor nodes and one or more non-anchor nodes in one or more communication networks is shown in accordance with an embodiment of the present invention. When a non-anchor node is in a range of two or more anchor nodes, two or more distance measurements are determined, at step 205. The two or more distance measurements correspond to a raw distance of the non-anchor node from the two or more anchor nodes. Further, the two or more distance measurements may be determined at predetermined intervals of time. The two or more distance measurements can be determined using one or more of, but not limited to, a time-difference of arrivals algorithm, time of arrival algorithm, signal strength difference measurement algorithm, angle of arrival method, radio propagation techniques which utilize a previously determined mapping of radio frequency (RF) characteristics and the like.

In the exemplary representation of FIG. 1, non-anchor node 105 is in range 115 of anchor node 110 as well as in range 125 of anchor node 120. As mentioned earlier, line 140 depicts a distance measurement between non-anchor node 105 and anchor node 110. Similarly, line 145 depicts a distance measurement between non-anchor node 105 and anchor node 120. Thus, the distance measurements corresponding to line 140 and line 145 are determined at step 205. The distance measurements may be determined by non-anchor node 105 or by anchor node 110 and anchor node 120. Further, in an embodiment of the present invention, a central controller may receive the distance measurements from non-anchor node 105 or from anchor node 110 and anchor node 120. An identity of each of the anchor nodes and the non-anchor node may also be received along with the distance measurements. For instance, let the distance measurement corresponding to line 140 be D1, the distance measurement corresponding to line 145 be D2, an identity of anchor node 110 be AN1, an identity of anchor node 120 be AN2 and an identity of non-anchor node 105 be NAN1. Then, the distance measurement and the identities may be received as (AN1, AN2) and (D1, D2) along with identity NAN1.

In an embodiment of the present invention, an anchor node may be configured to provide services corresponding to more than one communication networks. For example, anchor node 110 may be shared by a GSM network and a WiMAX network to provide corresponding services. In such a scenario, anchor node 110 can provide services corresponding to the GSM network and the WiMAX network to non-anchor node 105, if non-anchor node 105 is compatible with both, the GSM network and the WiMAX network. Further in accordance with this embodiment, a distance measurement between non-anchor node 105 and anchor node 110 may be determined based on either the GSM network or the WiMAX network, at step 205.

In yet another embodiment of the present invention, anchor node 110, anchor node 120 and anchor node 130 may be configured for GSM network as well as for a WiMAX network. Further, non-anchor node 105 may also be configured to operate in the GSM network as well as in the WiMAX network. In an exemplary scenario, non-anchor node 105 may be within range 115 of anchor node 110 and range 125 of anchor node 120 while operating in the GSM network. However, while operating in the WiMAX network, non-anchor node 105 may be in range 135 of anchor node 130, in addition to being in range 115 of anchor node 110 and range 125 of anchor node 120. In this scenario, a distance measurement corresponding to anchor node 130 can also be determined along with the distance measurements corresponding to anchor node 110 and anchor node 120.

In a further embodiment of the present invention, each of anchor node 110 and anchor node 120 may belong to different communication networks and can provide service to non-anchor node 105 if non-anchor node 105 is compatible with each of the different communication networks. For example, anchor node 110 may belong to a 3G based communication network and anchor node 120 may belong to a GSM network. In such a scenario, non-anchor node 105 can receive services from each of anchor node 110 and anchor node 120, if non-anchor node 105 is compatible with each of the 3G based communication network and the GSM network. Further in accordance with the embodiment, one or more distance measurements can be determined corresponding to one or more of anchor node 110 and anchor node 120, at step 205.

Upon determining the two or more distance measurements, an estimated distance between the two or more anchor nodes are calculated, at step 210, based on the two or more distance measurements. In an embodiment of the present invention, the estimated distance can be calculated by simply adding the two or more distance measurements. Referring back to the exemplary representation of FIG. 1, each of the distance measurements corresponding to line 140 and line 145 are added to calculate an estimated distance between anchor node 110 and anchor node 120. It will be apparent to a person with ordinary skill in the art that the estimated distance between anchor node 110 and anchor node 120 may be greater than or equal to a raw distance, depicted by line 150, between anchor node 110 and anchor node 120. For instance, the estimated distance is greater than the actual distance if non-anchor node 105 does not lie on line 150 and the estimated distance is equal to the actual distance if non-anchor node 105 lies on line 150. Thus, smaller the estimated distance, the closer it is to the raw distance.

Upon calculating the one or more estimated distances, a partial distance matrix is populated, at step 215, based on a predetermined condition. The partial distance matrix corresponds to the plurality of anchor nodes present in one or more communication networks 100 and comprises one or more distance entries. The one or more distance entries correspond to the estimated distances between each pair of anchor nodes in the plurality of anchor nodes. The partial distance matrix may have a "hole" if an estimated distance cannot be found between a pair of anchor nodes. Further, the predetermined condition can be to replace a stored estimated distance in the partial distance matrix with a new estimated distance, if the new estimated distance is smaller than the stored estimated distance. Alternately, the stored estimated distance is retained if the stored estimated distance is smaller than the new estimated distance. The partial distance matrix is updated at predetermined intervals of time so as to maintain a best estimate of the raw distances between each pair of anchor nodes belonging to the plurality of anchor node. Also, since only a smallest estimated distance is stored, the need to store all the previous values of the estimated distances is obviated.

Referring back to FIG. 1, the partial distance matrix has a distance entry corresponding to an estimated distance between anchor node 110 and anchor node 120. Initially, a stored estimated distance may be a summation of line 140 and line 145. When non-anchor node 105 moves to possible position 105' at the predetermined interval of time, the estimated distance is summation of line 140' and line 145'. The summation of line 140' and line 145' may be smaller than the summation of line 140 and line 145. Thus, the stored estimated distance is replaced with the new estimated distance, in accordance with the predetermined condition.

It will be apparent to a person skilled in the art that although the exemplary scenario observes a change in an estimated distance between anchor node 110 and anchor node 120 due to movement of non-anchor node 105, a change in the estimated distance between anchor node 110 and anchor node 120 may also be observed due to another non-anchor node which is present in range 115 of anchor node 110 as well as in range 125 of anchor node 120. Further, although the embodiment described above uses a partial distance matrix to store the one or more stored distances, a form of representation other than a partial distance matrix may be used for storing the distance entries.

A plurality of geographic coordinates corresponding to the plurality of anchor nodes in one or more communication networks 100 is, then, reconstructed, at step 220, based on the partial distance matrix. The plurality of geographic coordinates is reconstructed using one or more of a geometric build-up algorithm, a shortest-path algorithm and a multidimensional scaling algorithm. The reconstructing step 220 is explained in more detail in conjunction with FIG. 3 below.

Figure 3:
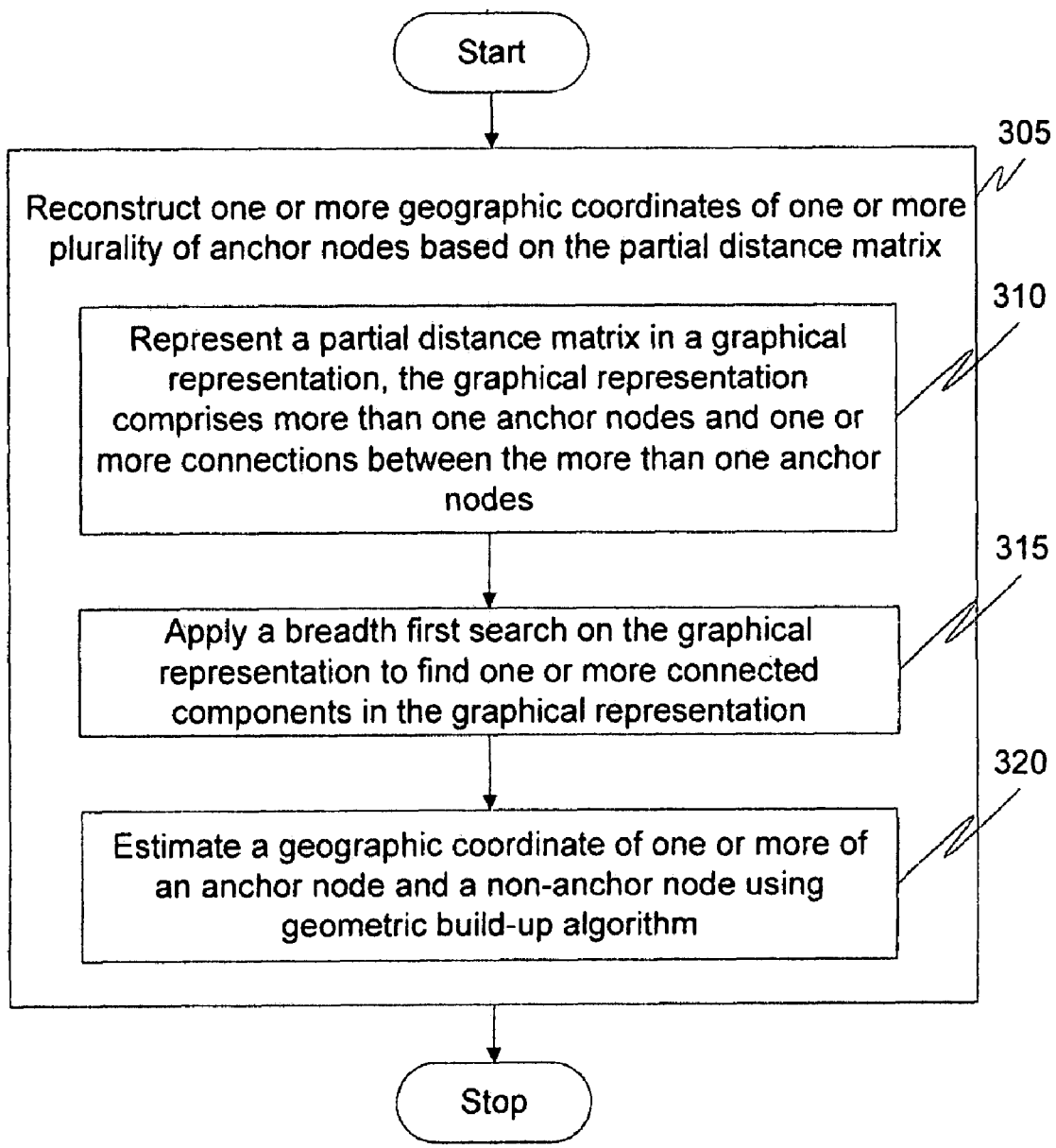
FIG. 3 illustrates a flow diagram of a method for reconstructing plurality of geographic coordinates of a plurality of anchor nodes in one or more communication networks in accordance with an embodiment of the present invention.

Referring now to FIG. 3, a flow diagram of a method for reconstructing a plurality of geographic coordinates of a plurality of anchor nodes in one or more communication networks is shown in accordance with an embodiment of the present invention. The reconstructing step, step 220 of FIG. 2, is depicted as step 305 in FIG. 3. For reconstructing the plurality of geographic coordinates of the plurality of anchor nodes, the partial distance matrix is represented in a graphical representation, at step 310. The graphical representation has the plurality of anchor nodes and one or more connections between the plurality of anchor nodes. Each of the one or more connections corresponds to a corresponding estimated distance in the partial distance matrix. In other words, a first connection between a first anchor node and a second anchor node in the graphical representation exists if an estimated distance corresponding to the first anchor nodes and the second anchor node exists in the partial distance matrix. For instance, the graphical representation has anchor node 110 and anchor node 120 and a connection between them since the estimated distance between them is calculated and stored in the partial distance matrix.

Thereafter, a breadth first search is applied on the graphical representation, at step 315. The breadth first search traverses the graphical representation to find a plurality of connected components in the graphical representation. The plurality of connected components comprises one or more anchor nodes with one or more connections between them. Once all the connected components are found, one or more geographic coordinates of one or more of an anchor node or of one or more non-anchor nodes in one or more communication networks 100 can be estimated using a geometric build-up algorithm, at step 320. The geometric build-up algorithm is discussed in detail in conjunction with FIG. 4 below.

Figure 4:
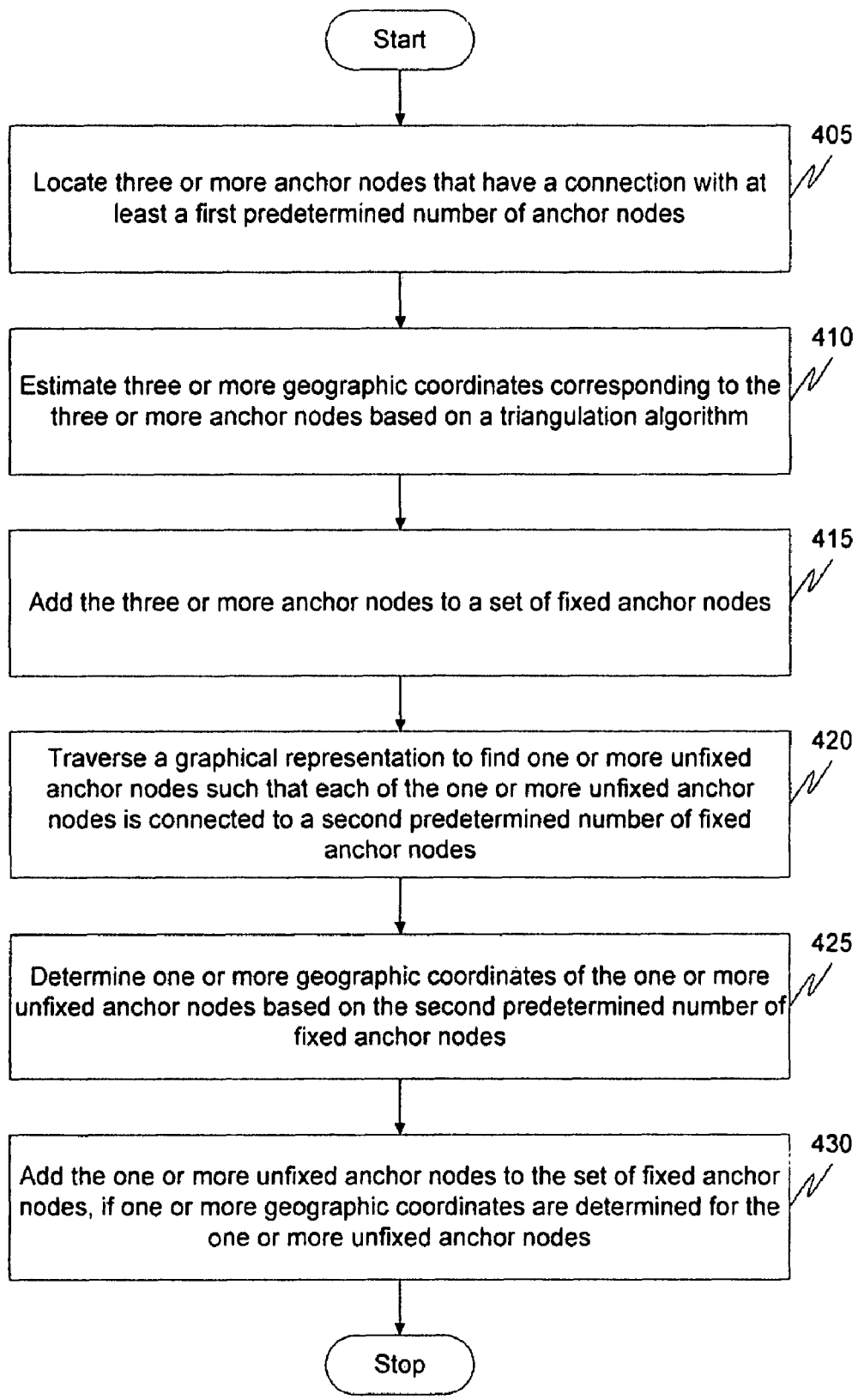
FIG. 4 illustrates a flow diagram of a geometric build-up algorithm in accordance with an embodiment of the present invention.

Referring now to FIG. 4, a flow diagram of a geometric build-up algorithm is shown, in accordance with an embodiment of the present invention. Once all the connected components are found using the breadth first search at step 315 of FIG. 3, the geometric build-up algorithm is used to estimate one or more geographic coordinates of one or more anchor nodes or of one or more non-anchor nodes in the connected components at step 320. For applying the geometric build-up algorithm, three or more anchor nodes are located, at step 405, such that the three or more anchor nodes have a connection with at least a first predetermined number of anchor nodes. In an embodiment of the present invention, the first predetermined number may be a maximum number of anchor nodes that any three or more connected components are connected to. In other words, three or more anchor nodes, which are densely connected, are located at step 405. In another embodiment of the present invention, the first predetermined number of anchor nodes may be specified beforehand.

Upon locating the three or more anchor nodes, three or more geographic coordinates corresponding to the three or more anchor nodes are estimated, at step 410. The estimation of the three or more geographic coordinates is based on a coordinate construction algorithm. A variety of coordinate construction algorithms for estimating the geographic coordinates are known in the art. For instance, in one algorithm a first anchor node belonging to the three or more anchor nodes is fixed as an absolute reference node with geographic coordinates (0, 0). Thereafter, a second anchor node belonging to the three or more anchor nodes is assigned a geographic coordinate of (D1, 0), where D1 is the estimated distance between the first anchor node and the second anchor node. Further, a third anchor node belonging to the three or more anchor nodes is assigned a distance (D2, D3) based on an estimated distance between the first anchor node and the third anchor node and an estimated distance between the second anchor node and the third anchor node. The method of finding (D2, D3) is known in the art.

Thereafter, the three or more anchor nodes are added to a set of fixed anchor nodes, at step 415. Anchor nodes for which the geographic coordinates are estimated or known, are hereinafter referred to as fixed anchor node. Anchor nodes for which the geographic coordinates are not estimated are hereinafter referred to as unfixed anchor nodes. The set of fixed anchor nodes comprises anchor nodes for which geographic coordinates are known. Unfixed anchor nodes are added to the set of fixed anchor nodes as and when the geographic coordinates of the unfixed anchor nodes are estimated, based on the absolute reference (0, 0) of the first anchor node.

Once the set of fixed anchor nodes is updated with the three or more anchor nodes, the graphical representation is traversed to find an unfixed anchor node, at step 420. A geographic coordinate of the unfixed anchor node is determined, at step 425, based on a second predetermined number of fixed anchor nodes to which it is connected.

For determining the geographic coordinate of the unfixed anchor node, there may be three possible scenarios based on the value of the second predetermined number of fixed anchor nodes. In a first scenario, the second predetermined number of fixed anchor nodes is one. That is, the unfixed anchor node is connected only to one fixed anchor node. A second scenario may be when the second predetermined number of fixed anchor nodes is two. That is, the unfixed anchor node is connected to two fixed anchor nodes. Lastly, a third scenario may be when the second predetermined number of fixed anchor nodes is three or greater than three. That is, the unfixed anchor node is connected to three or more fixed anchor node.

In the first scenario, when the unfixed anchor node is connected to only one fixed anchor node, the geometric build-up is discontinued. This is because determining an exact geographic coordinate of the unfixed anchor node is impossible when only an estimated distance between a fixed anchor node and the unfixed anchor node is known. Those skilled in the art will realize that the unfixed anchor node may lie anywhere on a circumference of a circle with center as the fixed anchor node and radius equal to the estimated distance between the fixed anchor node and the unfixed anchor node. The second scenario and the third scenario are discussed in detail in conjunction with FIG. 5 and FIG. 6 respectively.

After determining the geographic coordinates of the unfixed anchor node at step 425, the unfixed anchor node is added to the set of fixed anchor nodes, at step 430. However, if the geographic coordinates are not determined for the unfixed anchor node, the geometric build-up algorithm fails and the unfixed anchor node is not added to the set of fixed anchor nodes. The geographic coordinates of all the unfixed anchor nodes in the plurality of anchor nodes are determined in a similar way and these unfixed anchor nodes are added to the set of fixed anchor nodes. It will be appreciated that not all of the plurality of anchor nodes may be added to the set of fixed anchor nodes, for instance, if one or more unfixed anchor nodes are connected to only one fixed anchor node. A check may be performed on a number of fixed anchor nodes in the set of fixed anchor nodes. If the set of fixed anchor nodes comprises less than a third predetermined number of fixed anchor nodes and if the geometric build-up algorithm fails to determine the geographic coordinates of rest of the unfixed anchor nodes, then a shortest-path algorithm or a multidimensional scaling algorithm may be used for determining the geographic coordinates of the rest of the unfixed anchor nodes.

Figure 5:
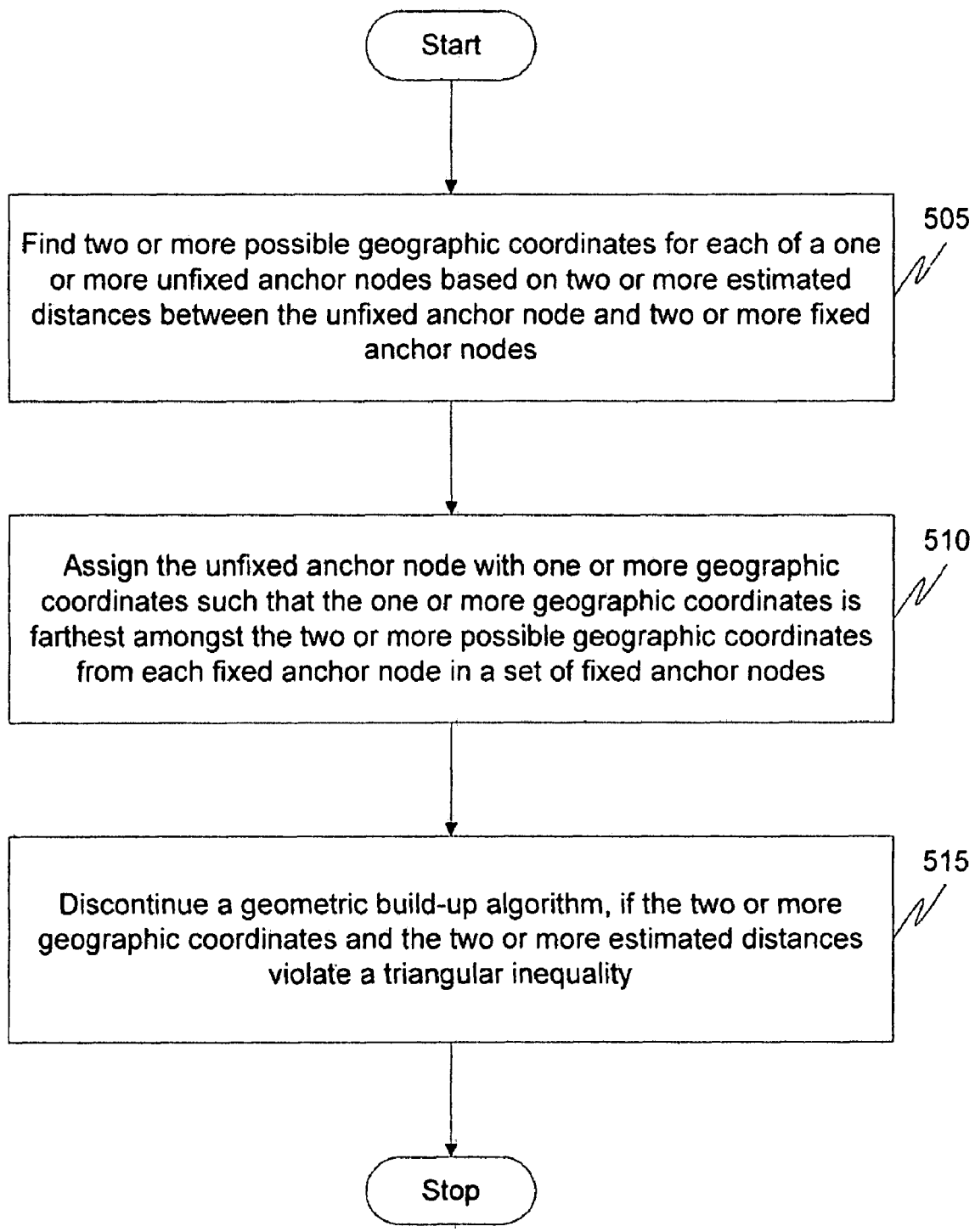
FIG. 5 illustrates a flow diagram of determining a geographic coordinate of an unfixed anchor node when the unfixed anchor node is connected to two fixed anchor nodes is shown, in accordance with an embodiment of the present invention.

Referring now to FIG. 5, a flow diagram of determining the geographic coordinates of an unfixed anchor node when the unfixed anchor node is connected to two fixed anchor nodes is shown, in accordance with an embodiment of the present invention. At step 505, two or more possible geographic coordinates of the unfixed anchor node are found based on two or more estimated distances between the unfixed anchor node and the two fixed anchor nodes. The two or more estimated distances comprise a first estimated distance between the unfixed anchor node and a first fixed anchor node of the two fixed anchor nodes and a second estimated distance between the unfixed anchor node and a second fixed anchor node of the two to more fixed anchor nodes. The two or more estimated distances may be retrieved form the partial distance matrix. Those skilled in the art will appreciate that the unfixed anchor node, which is connected to two fixed anchor nodes, may have at least two possible geographic coordinates, since the unfixed anchor node may lie on either side of a line joining the two fixed anchor nodes with the distance measurements. Thus, the unfixed anchor node may have a geographic coordinate corresponding to each side of the line joining the two fixed anchor nodes.

A geographic coordinate is selected from the two or more possible geographic coordinates which is farthest from any of the fixed anchor nodes in the set of fixed anchor nodes. The unfixed anchor node is assigned with that geographic coordinate, at step 510. A geographic coordinate which is farthest from any fixed anchor node is selected, since, a geographic coordinate which is closer to the set of fixed anchor nodes may be connected to one more fixed anchor node. This would imply that the unfixed anchor node is connected to three fixed anchor node, which is not true. In a scenario where the unfixed anchor node lies on a line joining the two fixed anchor nodes, only one possible geographic coordinate may be determined. In that case, the unfixed anchor node is assigned with that geographic coordinate.

After assigning the unfixed anchor node with the geographic coordinate, a consistency check is performed on the geographic coordinate. In an embodiment, the consistency check may be performed by checking the geographic coordinate for an inconsistent value. For example, an inconsistent value can be, but is not limited to, an arbitrarily large value, a complex number value, an imaginary number or the like. In an embodiment of the present invention, the consistency check may be performed by checking if the geographic coordinate assigned to the unfixed anchor node and the geographic coordinates of the two fixed anchor nodes satisfy a triangular inequality. Alternate embodiments can include any combination of methods for checking mathematical and/or physical consistency of the geographic coordinate assigned to the unfixed anchor node and the geographic coordinates of the two fixed anchor nodes. For example, an area of a triangle formed by the unfixed anchor node and the two fixed anchor nodes may be calculated and inconsistency of assigning the geographic coordinate to the unfixed anchor node can be determined if the area results in a negative value or an imaginary value. All such methods known in the art to determine a validity of assigning the geographic coordinate are within the scope of the present invention.

The geometric build-up algorithm is discontinued at step 515, if both of the two or more possible geographic coordinates and the estimated distances of the two fixed anchor nodes are inconsistent. The steps of FIG. 5 may be performed for each unfixed anchor node, which is connected to two fixed anchor nodes. The unfixed anchor nodes for which the geographic coordinates are determined and are consistent, are added to the set of fixed anchor nodes. Moreover, the steps of FIG. 5 may be repeated for the graphical representation with the set of fixed anchor nodes, now, including the unfixed anchor node with the assigned geographic coordinate. Those skilled in the art will realize that an unfixed anchor node that is initially connected to only one fixed anchor node may, now, be connected to two fixed anchor nodes, where one of the two fixed anchor nodes is the unfixed anchor node with the assigned geographic coordinate. The geometric build-up algorithm continues in a similar manner to obtain a complete set of fixed anchor nodes.

Figure 6:
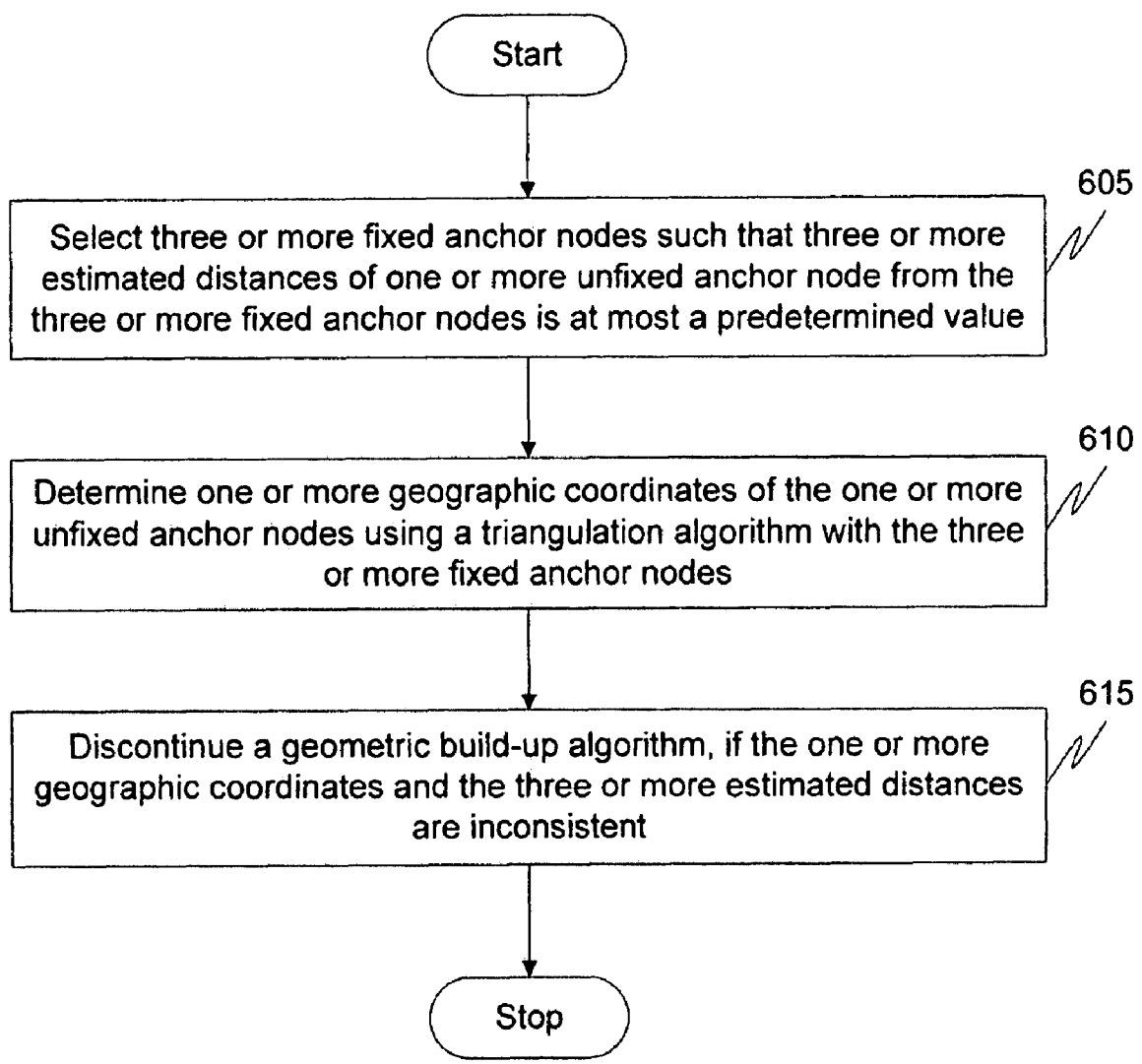
FIG. 6 illustrates a flow diagram of a flow diagram of determining a geographic coordinate of an unfixed anchor node when the unfixed anchor node is connected to three or more fixed anchor nodes is shown, in accordance with an embodiment of the present invention.

Referring now to FIG. 6, a flow diagram for determining the geographic coordinate of an unfixed anchor node when the unfixed anchor node is connected to three or more fixed anchor nodes is shown, in accordance with an embodiment of the present invention. Three fixed anchor nodes that are at most a predetermined value away from the unfixed anchor node are selected, at step 605. In an embodiment, more than three fixed anchor nodes may also be selected. The predetermined value may be dynamically selected such that the three fixed anchor nodes are closest among all the fixed anchor nodes connected to the unfixed anchor nodes. For this purpose, three distance measurements of the unfixed anchor node from the three fixed anchor nodes may be confirmed to be less than the predetermined value. In an embodiment of the present invention, the predetermined value may be previously specified.

Upon selecting the three fixed anchor nodes that are closest to the unfixed anchor node, a geographic coordinate for the unfixed anchor node is determined, at step 610. In an embodiment of the present invention a triangulation algorithm is used for determining the geographic coordinate. The triangulation algorithm is known in the art and is, generally, used to determine geographic coordinates of a first node when geographic coordinates of three other nodes connected to the first node are known. After determining the geographic coordinate of the unfixed anchor node, a consistency check is performed on the geographic coordinate. In an embodiment, the consistency check may be performed by checking the geographic coordinate for an inconsistent value. For example, an inconsistent value can be, but is not limited to, an arbitrarily large value, a complex number value, an imaginary number or the like. Alternate embodiments can include any combination of methods for checking mathematical and/or physical consistency of the geographic coordinate determined for the unfixed anchor node. For example, an area of a quadrilateral formed by the unfixed anchor node and the three fixed anchor nodes may be calculated. The geographic coordinate for the unfixed anchor node can be found to be inconsistent if the area results in a negative value or an imaginary value.

The geometric build-up algorithm is discontinued at step 615, if the geographic coordinate determined for the unfixed anchor node and the three distance measurements between the three fixed anchor nodes are inconsistent. The steps of FIG. 6 may be performed for each unfixed anchor node, which is connected to three or more fixed anchor nodes. The unfixed anchor nodes for which the geographic coordinates are determined and are consistent, are added to the set of fixed anchor nodes. Moreover, the steps of FIG. 6 may be repeated for the graphical representation with the set of fixed anchor nodes, now, including the unfixed anchor node for which the geographic coordinate is determined. Those skilled in the art will realize that an unfixed anchor node that is initially connected to only two fixed anchor nodes may, now, be connected to three fixed anchor nodes, where one of the three fixed anchor nodes is the unfixed anchor node for which the geographic coordinate is determined. The geometric build-up algorithm continues in a similar manner to obtain a complete set of fixed anchor nodes. Having determined the complete set of fixed anchor nodes, geographic coordinates of any arbitrary non-anchor node or an anchor node inside one or more communication networks may be determined. Thus, the geographic coordinates of a plurality of base stations in a wireless communication network may be determined using the geometric build-up algorithm described above. Further, based on the geographic coordinates of the plurality of base stations, a geographic coordinate of a mobile station roaming in a range of one or more base station can be determined. A geographic coordinate of a new base station added to the plurality of base stations may be also determined using a similar method.

Figure 7:
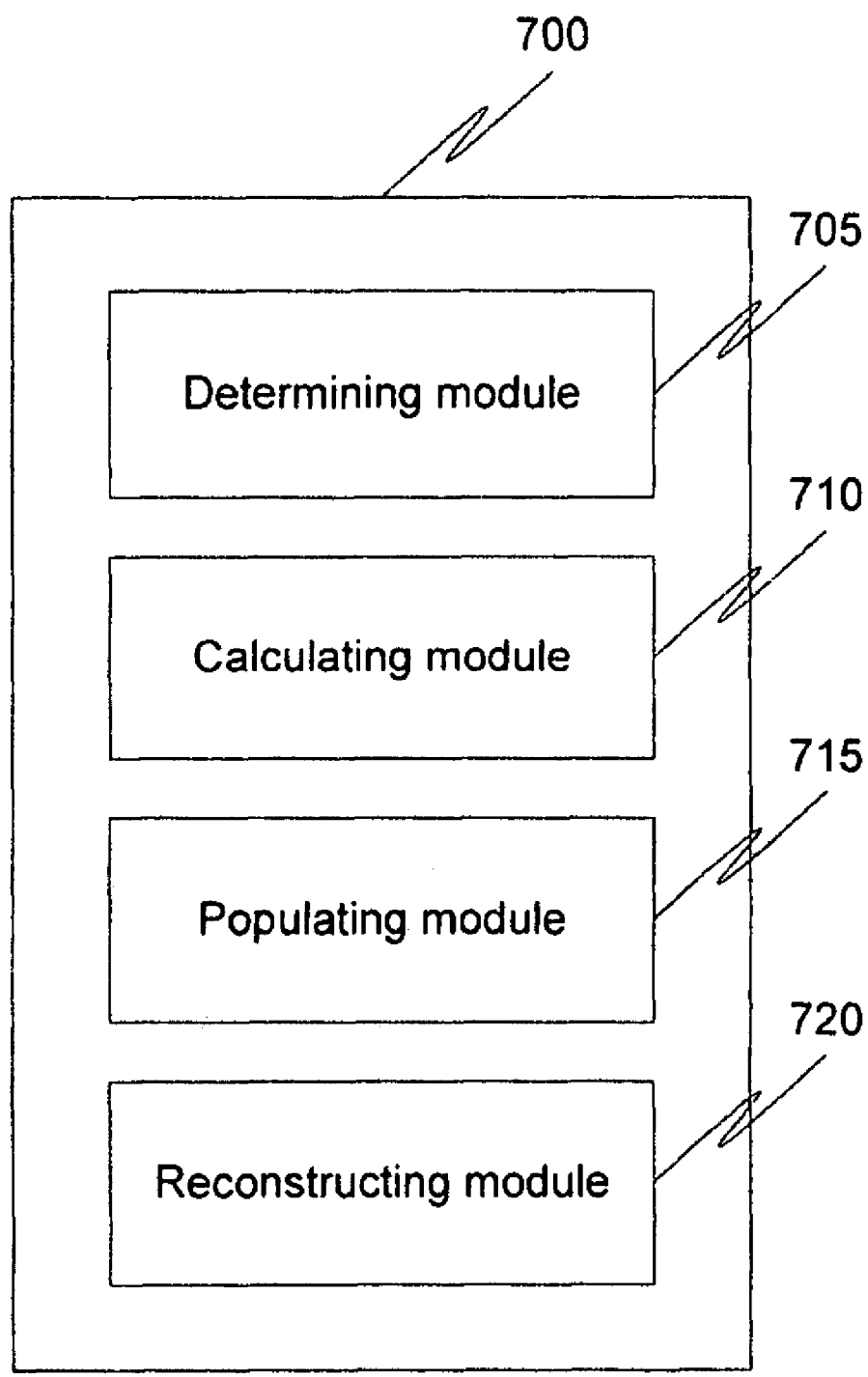
FIG. 7 illustrates a block diagram of a system for positioning one or more anchor nodes or one or more non-anchor nodes in one or more communication networks in accordance with an embodiment of the present invention.

Referring now to FIG. 7, a block diagram of a system 700 for positioning one or more anchor nodes or one or more non-anchor nodes in one or more communication networks is shown in accordance with an embodiment of the present invention. When a non-anchor node is in a range of two or more anchor nodes, two or more distance measurements corresponding to a raw distance of the non-anchor node from each of the two or more anchor nodes are determined by a determining module 705. For instance, referring back to FIG. 1, non-anchor node 105 is in range 115 of anchor node 110 as well as in range 125 of anchor node 120. Thus, in accordance with the present embodiment, determining module 705 determines a distance measurement, line 140, between anchor node 110 and non-anchor node 105 and a distance measurement, line 145, between anchor node 120 and non-anchor node 105. As mentioned earlier, the two or more distance measurements may be determined at the non-anchor node or at the anchor nodes. Hence, determining module 705 may reside on the non-anchor node or on the anchor nodes. Determining module 705 may also reside on a central controller in the one or more communication networks.

Further, the two or more distance measurements may be determined at predetermined intervals of time. As discussed in conjunction with FIG. 2, the two or more distance measurements can be determined using one or more of, but not limited to, a time-difference of arrivals algorithm, time of arrival algorithm, signal strength difference measurement algorithm, angle of arrival method, radio propagation techniques which utilize a previously determined mapping of radio frequency (RF) characteristics or the like. In the embodiment of the present invention, where determining module 705 resides on a non-anchor node or on anchor nodes, a central controller may receive the two or more distance measurements from determining module 705. Further, an identity of each of the anchor nodes and the non-anchor nodes may also be received along with the two or more distance measurements by receiving module 705.

A calculating module 710, then calculates one or more estimated distances between the two or more anchor nodes are calculated based on the two or more distance measurements. In an embodiment of the present invention, the one or more estimated distance can be calculated by simply adding the two or more distance measurements. As discussed in conjunction with FIG. 2, at predetermined intervals of time, the two or more distance measurements are determined and the one or more estimated distances are calculated. A previous estimated distance between a pair of anchor nodes is replaced with a new estimated distance between the pair of anchor nodes, if the new estimated distance is smaller than the previous estimated distance.

Thereafter, a populating module 715 populates a partial distance matrix based on a predetermined condition. The partial distance matrix corresponds to a plurality of anchor nodes present in one or more communication networks 100 and comprises one or more distance entries. The one or more distance entries correspond to the estimated distances between each pair of anchor nodes in the plurality of anchor nodes. As discussed in conjunction with FIG. 2, the partial distance matrix may have a "hole" if an estimated distance cannot be found between a pair of anchor nodes. Further, the predetermined condition can be to replace a stored estimated distance in the partial distance matrix with a new estimated distance, if the new estimated distance is smaller than the stored estimated distance. Alternately, the stored estimated distance is retained if the stored estimated distance is smaller than the new estimated distance. The partial distance matrix is updated at the predetermined intervals of time so as to maintain a best estimate of the actual distances between each pair of anchor nodes belonging to the plurality of anchor node.

Referring back to FIG. 1, the partial distance matrix has a distance entry corresponding to an estimated distance between anchor node 110 and anchor node 120. Initially, a stored estimated distance may be a summation of line 140 and line 145. When non-anchor node 105 moves to possible position 105', the estimated distance is summation of line 140' and line 145'. The summation of line 140' and line 145' may be smaller than the summation of line 140 and line 145. Thus, populating module 715 replaces the stored estimated distance with the new estimated distance, in accordance with the predetermined condition. Further, although in the embodiment described above, populating module 715 uses a partial distance matrix to store the one or more stored distances, a form of representation other than a partial distance matrix may be used for storing the distance entries.

A reconstructing module 720, then, reconstructs a plurality of geographic coordinates corresponding to the plurality of anchor nodes in one or more communication networks 100, based on the partial distance matrix. The plurality of geographic coordinates is reconstructed using one or more of a geometric build-up algorithm, a shortest-path algorithm and a multidimensional scaling algorithm. Reconstructing module 720 is explained in detail in conjunction with FIG. 8 below.

In an embodiment of the present invention, system 700 may reside on an anchor node in one or more communication networks 100. That is, system 700 may be incorporated into a base station belonging to one or more communication networks. Alternatively, system 700 may reside as a separate entity adaptively coupled to one or more anchor nodes in one or more communication networks 100. In another embodiment, system 700 may also reside on a central controller in one or more communication networks 100.

Further, in one embodiment, calculating module 710 may reside on an anchor node or on a non-anchor node in one or more communication networks. In accordance with this embodiment, the estimated distances may be received at the central controller or at the anchor node, whichever is responsible for reconstructing the geographic coordinates of the plurality of anchor nodes.

Figure 8:
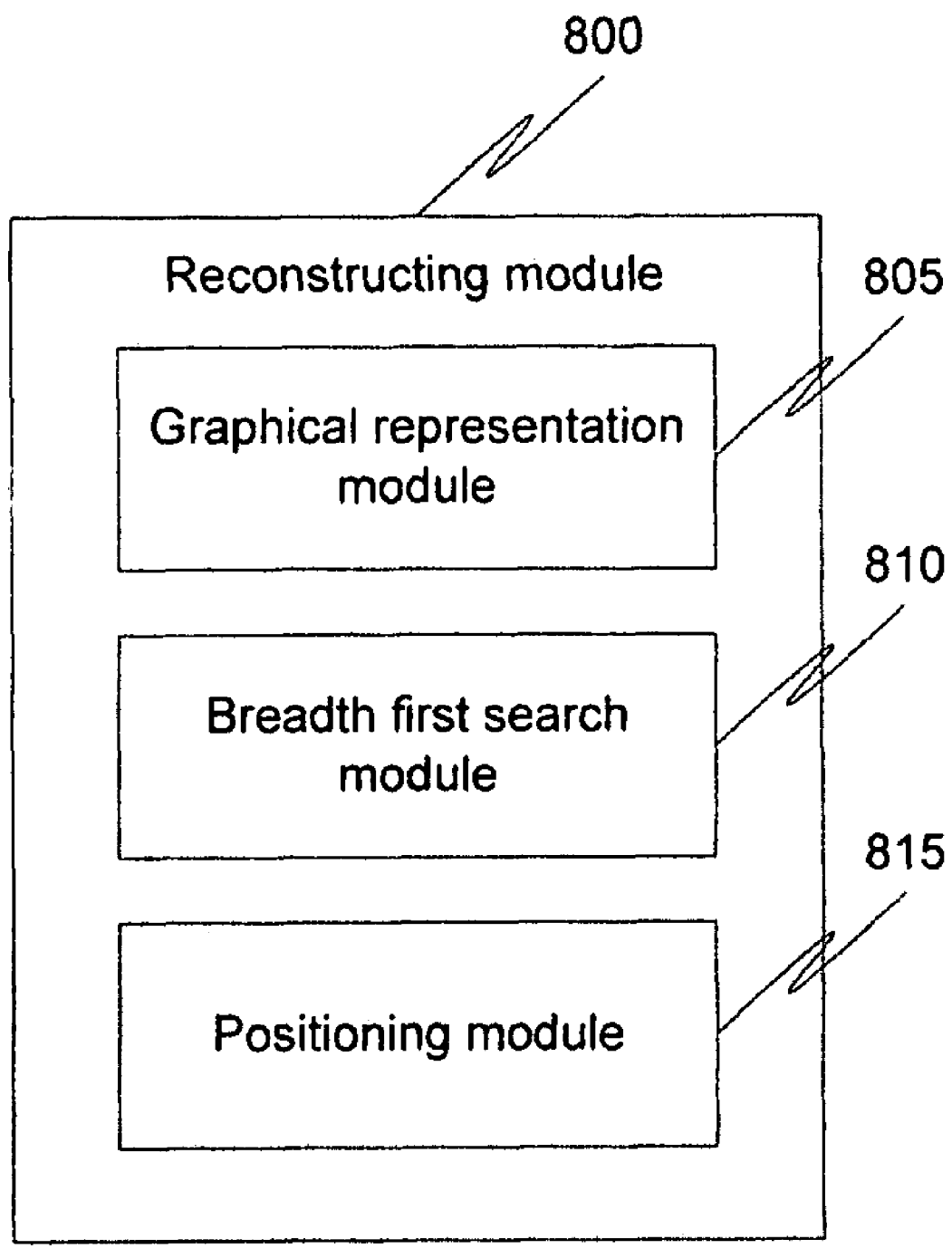
FIG. 8 illustrates a block diagram of a reconstructing module in accordance with an embodiment of the present invention.

Referring now to FIG. 8, a block diagram of a reconstructing module 800, for reconstructing a plurality of geographic coordinates of a plurality of anchor nodes in one or more communication networks is shown in accordance with an embodiment of the present invention. Reconstructing module 720 of FIG. 7 is depicted as reconstructing module 800 in FIG. 8. For reconstructing the plurality of geographic coordinates of the plurality of anchor nodes, a graphical representation module 805 represents the partial distance matrix in a graphical representation. As explained in conjunction with FIG. 3, the graphical representation has the plurality of anchor nodes and one or more connections between the plurality of anchor nodes. Each of the one or more connections corresponds to an estimated distance in the partial distance matrix.

Thereafter, a breadth first search module 810 applies a breadth first search on the graphical representation. Breadth first search module 810 traverses the graphical representation to find a plurality of connected components in the graphical representation. The plurality of connected components comprises one or more anchor nodes with one or more connections between them. Once all the connected components are found, a positioning module 815 estimates a geographic coordinate of an anchor node or a non-anchor node in one or more communication networks. Positioning module 815 may use one or more of a geometric build-up algorithm, a shortest-path algorithm and a multidimensional scaling algorithm.

In an embodiment of the present invention, positioning module 815 estimates one or more geographic coordinates of one or more anchor nodes using the geometric build-up algorithm. If an anchor node is connected to one fixed anchor node, then the geometric build-up algorithm may not be able to determine the geographic coordinates of the anchor node. If an anchor node is connected to two or more fixed anchor nodes, then the geographic coordinates of the anchor node may be found. Various scenarios that deal with the geometric build-up algorithm are explained in conjunction with FIG. 4, FIG. 5 and FIG. 6 above. In case the geometric build-up algorithm is discontinued, positioning module 815 estimates the geographic coordinate using a shortest-path algorithm or a multidimensional scaling algorithm. The shortest-path algorithm and the multidimensional scaling algorithm are known in art.

After reconstructing the geographic coordinates of the plurality of anchor nodes in one or more communication networks 100 based on the methods described in FIG. 2 to FIG. 6 above, positioning module 815 can determine a geographic coordinate of non-anchor node 105. Positioning module 815 may use a triangulation algorithm for reconstructing the geographic coordinate of non-anchor node 105. Similarly, geographic coordinates of any non-anchor node roaming in one or more communication networks 100 can be reconstructed.

Various embodiments of the present invention provide methods and systems for determining geographic coordinates of anchor nodes or non-anchor nodes in one or more communication networks using partial distance information. In accordance with various embodiments of the present invention, when a non-anchor node is in a range of two or more anchor nodes, one or more estimated distances between the two or more anchor nodes can be estimated using distance measurements between the non-anchor node and two or more anchor nodes. The one or more estimated distances are used to determine the geographic coordinates of the two or more anchor nodes based on one or more of a geometric build-up algorithm, a shortest-path algorithm and a multidimensional scaling algorithm. The geographic coordinates of the two or more anchor nodes can further be used to locate one or more non-anchor nodes in the one or more communication networks.

The present invention thus provides a method for determining geographic coordinates of anchor nodes or non-anchor nodes using partial distance information, without the need for installation of expensive sensors. Further, the present invention enables deployment of the proposed methods without the need to upgrade the existing anchor nodes or non-anchor nodes.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for positioning a plurality of anchor nodes in one or more communication networks, the method comprising:

determining raw distances of at least two anchor nodes of the plurality of anchor nodes from at least one non-anchor node at predetermined intervals of time, wherein the at least one non-anchor node is located in a range of the at least two anchor nodes;

calculating an estimated distance between the at least two anchor nodes at the predetermined intervals of time based on the determined raw distances of the at least two anchor nodes from the at least one non-anchor node;

populating a partial distance matrix with the estimated distance between the at least two anchor nodes at the predetermined intervals of time based on a predetermined condition, wherein the predetermined condition is a condition to update stored estimated distance between the at least two anchor nodes with the estimated distance; and reconstructing a plurality of geographic coordinates of the plurality of anchor nodes based on the populated partial distance matrix, wherein the plurality of geographic coordinates are reconstructed based on at least one of a geometric build-up algorithm, a shortest-path algorithm, and a multidimensional scaling algorithm.

2. The method of claim 1, wherein an anchor node is a base station and a non-anchor node is a mobile station.

3. The method of claim 1, wherein a first anchor node of the at least two anchor nodes belongs to at least a first communication network and a second anchor node of the at least two anchor nodes belongs to at least a second communication network, the first communication network and the second communication network belonging to the one or more communication networks, wherein the non-anchor node is compatible with each of the first communication network and the second communication network.

4. The method of claim 1, wherein the raw distance of the at least two anchor nodes from the non anchor node is obtained by applying at least one of a time-difference of arrivals algorithm, a time of arrival algorithm, and a signal strength difference measurement algorithm at the at least one non-anchor node.

5. The method of claim 1, wherein if the estimated distance is smaller than a stored estimated distance, then the stored estimated distance is updated with the estimated distance; and if not, then the stored estimated distance is maintained.

6. The method of claim 1, wherein the reconstructing the plurality of geographic coordinates of the plurality of anchor nodes comprises:

representing the partial distance matrix in a graphical representation, wherein the graphical representation comprises the plurality of anchor nodes and one or more connections between the plurality of anchor nodes, wherein the one or more connections are based on the estimated distance between the at least two anchor nodes in the populated partial distance matrix;

applying a breadth first search on the graphical representation to find a plurality of connected components in the graphical representation, wherein the plurality of connected components comprise one or more of the plurality of anchor nodes with the one or more connections; and estimating a geographic coordinate of the at least one of the anchor node and the non-anchor node using the geometric build-up algorithm.

7. The method of claim 6, wherein the geometric build-up algorithm comprises:

locating at least three anchor nodes that have a connection with at least a first predetermined number of anchor nodes, wherein each of the at least three anchor nodes has a connection with each of the at least three anchor nodes;

estimating at least three geographic coordinates corresponding to the at least three anchor nodes based on a coordinate construction algorithm;

adding the at least three anchor nodes to a set of fixed anchor nodes, wherein one or more geographic coordinates of each anchor node in the set of fixed anchor nodes are known;

traversing the graphical representation to find at least one unfixed anchor node, wherein the at least one unfixed anchor node is connected to a second predetermined number of fixed anchor nodes;

determining at least one geographic coordinate of the at least one unfixed anchor node based on the second predetermined number of fixed anchor nodes; and adding the at least one unfixed anchor node to the set of fixed anchor nodes, if the at least one geographic coordinate is determined for the at least one unfixed anchor node.

8. The method of claim 7, wherein if the second predetermined number of fixed anchor nodes is one, then discontinuing the geometric build-up algorithm.

9. The method of claim 7, wherein if the second predetermined number of fixed anchor nodes is two, the at least one unfixed anchor node being connected to two fixed anchor nodes, then performing:

finding at least two possible geographic coordinates for the at least one unfixed anchor node, based on at least two estimated distances between the at least one unfixed anchor node and the two fixed anchor node;

assigning the at least one unfixed anchor node with the at least one geographic coordinate, the at least one geographic coordinate belonging to the at least two possible geographic coordinates, wherein the at least one geographic coordinate is farthest amongst the at least two possible geographic coordinates from each fixed anchor node in the set of fixed anchor nodes; and discontinuing the geometric build-up algorithm, if the at least two possible geographic coordinates and the at least two estimated distances are inconsistent.

10. The method of claim 7, wherein if the second predetermined number of fixed anchor nodes is three or more, the at least one unfixed anchor node being connected to three or more fixed anchor nodes, then performing:

selecting at least three fixed anchor nodes, wherein at least three estimated distances of the at least one unfixed anchor node from the at least three fixed anchor nodes is at most a predetermined value;

determining the at least one geographic coordinate of the at least one unfixed anchor node using a triangulation algorithm with the at least three fixed anchor nodes; and discontinuing the geometric build-up algorithm, if the at least one geographic coordinate and the at least three estimated distances are inconsistent.

11. The method of claim 7 further comprises estimating the geographic coordinate of the non-anchor node based on the set of fixed anchor nodes.

12. The method of claim 7, wherein if at least a third predetermined number of fixed anchor nodes is absent in the set of fixed anchor nodes, then one or more geographic coordinates of one or more anchor nodes are reconstructed using at least one of a shortest-path algorithm and a multidimensional scaling algorithm.

13. A system for positioning a plurality of anchor nodes in one or more communication networks, the system comprising:

a determining module, wherein the determining module is configured for determining raw distances of at least two anchor nodes of the plurality of anchor nodes from at least one non-anchor node at predetermined intervals of time, wherein the at least one non-anchor node is located in a range of the at least two anchor nodes;

a calculating module, wherein the calculating module is configured for calculating an estimated distance between the at least two anchor nodes at the predetermined intervals of time based on determined raw distances of the at least two anchor nodes from the at least one non-anchor node;

a populating module, wherein the populating module is configured for populating a partial distance matrix with the estimated distance between the at least two anchor nodes at the predetermined intervals of time based on a predetermined condition, wherein the predetermined condition is a condition to update stored estimated distance between the at least two anchor nodes with the estimated distance; and a reconstructing module, wherein the reconstructing module is configured for reconstructing a plurality of geographic coordinates of the plurality of anchor nodes based on the populated partial distance matrix, wherein the plurality of geographic coordinates are reconstructed based on at least one of a geometric build-up algorithm, a shortest-path algorithm, and a multidimensional scaling algorithm.

14. The system of claim 13, wherein the reconstructing module comprises:

a graphical representation module, wherein the graphical representation module is configured for representing the partial distance matrix in a graphical representation, wherein the graphical representation comprises the plurality of anchor nodes and one or more connections between the plurality of anchor nodes, wherein the one or more connections are based on the estimated distance between the at least two anchor nodes in the populated partial distance matrix;

a breadth first search module, wherein the breadth first search module is configured for applying a breadth first search on the graphical representation to find a plurality of connected components in the graphical representation, wherein the plurality of connected components comprise one or more of the plurality of anchor nodes; and a positioning module, wherein the positioning module is configured for using at least one of a geometric build-up algorithm, a shortest-path algorithm and a multidimensional scaling algorithm to estimate a geographic coordinate of the at least one of the anchor node and the non-anchor node.

15. The system of claim 13, wherein if the geometric build-up algorithm fails, then the positioning module reconstructs one or more geographic coordinates of one or more anchor nodes using at least one of the shortest-path algorithm and the multidimensional scaling algorithm.

16. A non-transitory computer readable medium having instructions, that when executed by a computing platform, result in execution of a method for positioning a plurality of anchor nodes in one or more communication networks, the method comprising:

determining raw distances of at least two anchor nodes of the plurality of anchor nodes from at least one non-anchor node at predetermined intervals of time, wherein the at least one non-anchor node is located in a range of the at least two anchor nodes;

calculating an estimated distance between the at least two anchor nodes at the predetermined intervals of time based on the determined raw distances of the at least two anchor nodes from the at least one non-anchor node;

populating a partial distance matrix with the estimated distance between the at least two anchor nodes at the predetermined intervals of time based on a predetermined condition, wherein the predetermined condition is a condition to update stored estimated distance between the at least two anchor nodes with the estimated distance; and reconstructing a plurality of geographic coordinates of the plurality of anchor nodes based on the populated partial distance matrix, wherein the plurality of geographic coordinates are reconstructed based on at least one of a geometric build-up algorithm, a shortest-path algorithm, and a multidimensional scaling algorithm.

17. The method of claim 1, wherein the at least one non-anchor node communicates with the at least two anchor nodes when the at least one non-anchor node is located in the range of the at least two anchor nodes.

18. The system of claim 13, wherein the at least one non-anchor node communicates with the at least two anchor nodes when the at least one non-anchor node is located in the range of the at least two anchor nodes.

19. The method of claim 1, wherein calculating the estimated distance between the at least two anchor nodes comprises adding the determined raw distances of the at least two anchor nodes from at least one non-anchor node.

20. The method of claim 5, wherein the stored estimated distance comprises a distance between the at least two anchor nodes.

* * * * *